(No Model.)
H. C. BEVAN & W. R. JAMES.
PNEUMATIC OR CUSHION WHEEL FOR VELOCIPEDES.
No. 587,174. Patented July 27, 1897.
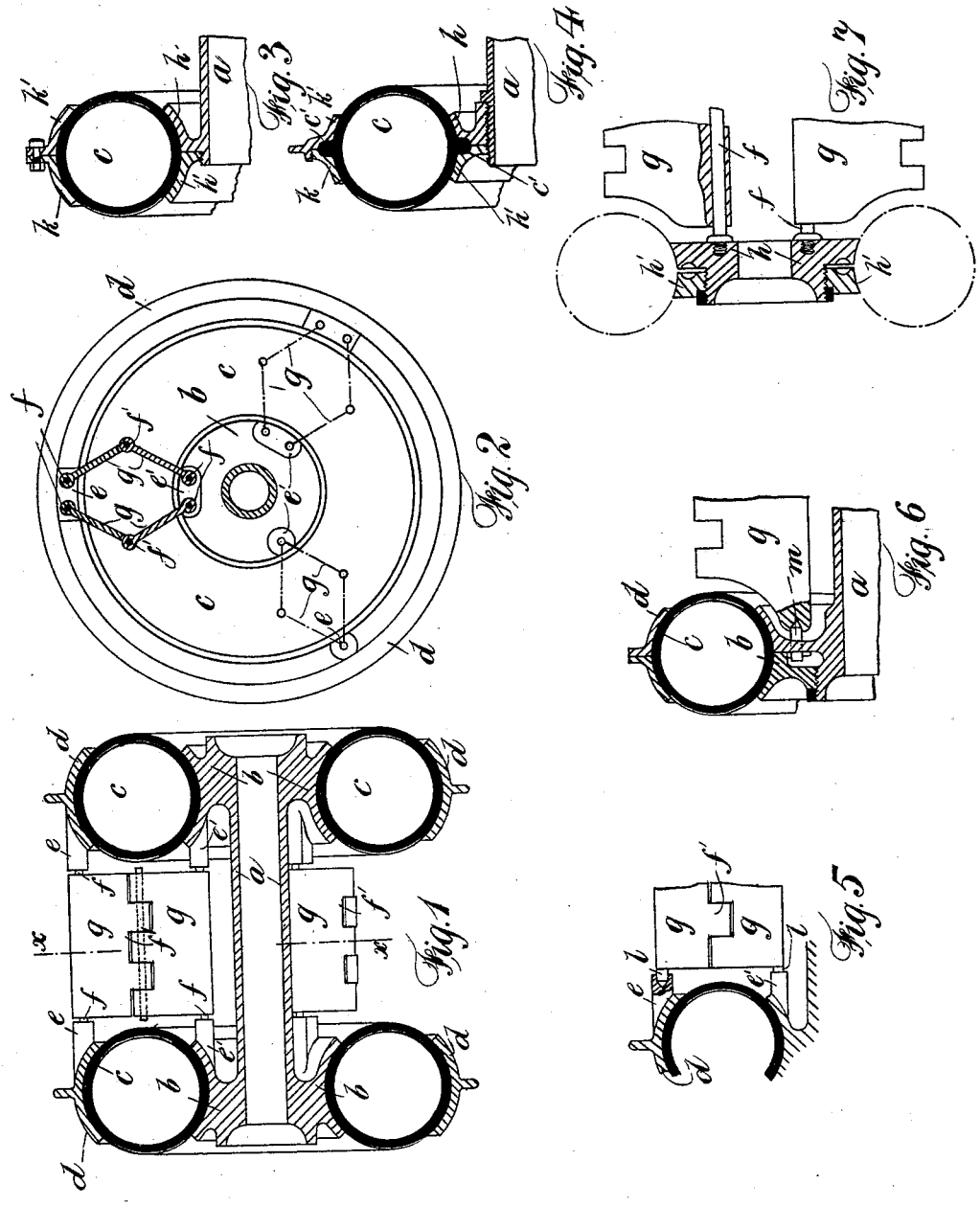
Witnesses:
E. B. Bolton
Inventors:
Henry Crook Bevan
William Rees James
By Richards
his Attorneys.

UNITED STATES PATENT OFFICE.

HENRY CROOK BEVAN AND WILLIAM REES JAMES, OF BLAINA, ENGLAND.

PNEUMATIC OR CUSHION WHEEL FOR VELOCIPEDES.

SPECIFICATION forming part of Letters Patent No. 587,174, dated July 27, 1897.

Application filed March 15, 1897. Serial No. 627,653. (No model.) Patented in England April 7, 1896, No. 7,421, and September 17, 1896, No. 20,607.

*To all whom it may concern:*

Be it known that we, HENRY CROOK BEVAN, medical practitioner, residing at Blaina, and WILLIAM REES JAMES, electrician, residing at 3 Lancaster Street, Blaina, in the county of Monmouth, England, subjects of the Queen of Great Britain and Ireland, have invented certain new and useful Improvements in Pneumatic or Cushion Wheels for Velocipedes and Like Purposes, (for which we have applied for patents in Great Britain, No. 7,421, bearing date April 7, 1896, and No. 20,607, bearing date September 17, 1896,) of which the following is a specification.

This invention refers to cushioned or elastic wheels for vehicles of all kinds, and is designed to supply an efficient substitute for the elastic periphery at present employed to prevent vibration and minimize the effects of concussion on rough roads.

Around the flanges of the hub where the wire spokes are usually attached we fix or form rims of any suitable section to receive suitable elastic cushions or annular pneumatic tubes. We attach the hub end of the spokes to similar rims, the concavity or front of which faces the concavity or front of the rim on the hub. Between each pair of these rims we introduce an elastic cushion or inflatable pneumatic tube or series of elastic balls or other elastic device which will form a cushion to receive and neutralize all the vibration of the wheel.

In some cases—as, for instance, where a great weight has to be carried—we may use only one pair of concentric rims of large size instead of two pairs and with one pneumatic tube or cushion between them. In this case the hub ends of the spokes may be connected to the single rim instead of to the pair of rims, as above stated.

In order to prevent a sudden side twist from displacing the wheel from the hub, we connect the said rims together by means of special jointed links set on edge, so as to resist side strain, while allowing free vertical action. For convenience of reference we call these "toggle-joints." These joints are formed by preference of four links of equal or nearly equal length, but any suitable number may be used, and they are pivoted or hinged together at their extremities, so as to form a square, diamond, or other figure, their other ends being attached to the said rim or to brackets attached thereto. Several of these toggle-joints can be employed. When parallel rims are used, each of the concentric rims will also be connected laterally or horizontally with its fellow parallel rim in the adjoining row of spokes by means of the said toggle-joints—that is to say, by the pivot-pin on which the links of the toggle-joints turn. These pivot-pins make the rims firm against side twist and will be found no obstacle to the elastic action of the cushion or pneumatic tube.

We will now describe the invention with reference to the accompanying drawings, in which—

Figure 1 shows a sectional front elevation of our improved hub for the wheels of velocipedes and like vehicles, the pneumatic tubes here shown being held by undivided rims. Fig. 2 shows a sectional side elevation of same on the line $x\,x$, Fig. 1. Fig. 3 shows a cross-section of the rim with pneumatic tube fitted with vertically-divided rims for the more convenient handling of the tube. The outer half of the inner rim is shown as screwed into position on the end of the axle-sleeve. Fig. 4 shows a modified form of rim to that shown in Fig. 3, consisting of smaller rims with a central recess to receive a circumferential bead formed around the pneumatic tube, by which formation this form of rim obtains a more secure grip. Both halves of the inner rim are shown as screwed onto the end of the axle-sleeve. The outer half of the outer rim is also shown screwed into a socket formed in the inner half of the outer rim. Fig. 5 shows an alternative method of connecting the toggle-links $g\,g$ to the inner and outer rims, applicable to divided or undivided rims—viz., by means of lugs $l\,l$, projecting from the links, said lugs being recessed into the brackets $e\,e'$. Fig. 6 shows a method the reverse of the above for connecting the links $g\,g$ to the inner and outer rims. In this figure only one link is shown. It consists of a pin $m$, fastened in and projecting from an extension-piece of the rim, the outer end of said pin being recessed into the link $g$. Fig. 7 shows a method of dispensing with the axle box or sleeve $a$.

The rims are attached to the end of the toggle-link pins $f\,f$.

We reserve the right to employ any well-known system of ball-bearings for the toggle-link joints.

$a$ is the axle-box of the hub.

$b\,b$ are a pair of inner concentric rims with a concaved periphery to hold the pneumatic tube $c$ in place on one side, and $d\,d$ are the outer rims to hold the tube $c$ in place on the other side.

The pair of inner rims $b\,b$ may be cast solid at the ends of the axle-box, as shown, or they may be attached in any other suitable way.

$e\,e$ are brackets attached to rim $d$, which serves to support the ends of pins $f\,f$, and these pins form pivots for the links $g\,g$, the upper and lower links being connected together by a hinge or other suitable joint $f'$, which may be formed so as to be readily disconnected, if desired.

Instead of two separate pins $f$, as shown, one only may be used and the links $g$ both pivoted to the same pin. This alternative plan is shown in dotted lines in Fig. 2.

There may be one, two, or more sets of links, each set forming a modified toggle-joint. In some cases one pneumatic tube only may be used, in which event the sets of toggle-links would be placed one on either side of the tube.

Referring to Figs. 3 and 4, $h\,h'$ and $k\,k'$ are the half-rims, $k\,k'$ (the outer half-rims) being connected by a bolt and nut or in any other suitable way, and in the case of the inner rim the half $h$ being formed solid with the axle-box or screwed onto the same and $h'$ being screwed into position on the end of said axle-box. As shown in Fig. 4, the half $k$ of the outer rim may be screwed into a flange projecting from the other half $k'$. $c'$ is a circumferential ridge formed round the tube $c$ to afford the rims $h\,h'\,k\,k'$ a better grip of same.

By the foregoing arrangement we construct a wheel with the required elasticity, in which the cushioned or pneumatic tires are protected from puncture or the wear of the road and on the periphery of which a hard tire can be used free from side slip or from injury on the roughest road.

Having now described our invention, what we claim as new, and desire to secure by Letters Patent, is—

1. In combination with the hub heads or flanges, the pairs of rims $d, d$, the pneumatic tubes between the same and the hub-heads, and the toggle-levers arranged between the members of the pairs of rims, the outer ends of the said toggle-levers being pivoted to the rims, the inner ends being pivoted to the hub-heads and the intermediate parts of the levers being pivoted together, the arrangement of said levers being substantially radial in respect to the hub, substantially as described.

2. In combination with the hub-heads made in two parts connected together, the rims made in two parts connected together, the air-tubes between the heads and rims, and the toggle-levers connecting the heads and rims and extending between the members of the pair of tubes, substantialy as described.

3. In combination the hub-heads, the pair of rims, the pair of air-tubes between, the pintles extending from hub-head to hub-head and forming the connection between them, and the toggles pivoted on the pintles at their inner ends and pivoted to the rims at their outer ends, substantialy as described.

In witness whereof we have hereunto set our hands in presence of two witnesses.

HENRY CROOK BEVAN.
  WILLIAM REES JAMES.

Witnesses:
 WM. WADE,
 T. NEWTON WADE.